United States Patent
Ding et al.

(10) Patent No.: US 6,374,003 B1
(45) Date of Patent: Apr. 16, 2002

(54) METHOD AND APPARATUS FOR OPTICALLY MODULATING LIGHT THROUGH THE BACK SIDE OF AN INTEGRATED CIRCUIT DIE USING A PLURALITY OF OPTICAL BEAMS

(75) Inventors: Yi Ding; Mario J. Paniccia, both of Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/410,195

(22) Filed: Sep. 30, 1999

Related U.S. Application Data

(63) Continuation-in-part of application No. 08/993,786, filed on Dec. 19, 1997, now Pat. No. 6,075,908.

(51) Int. Cl.[7] .............................. G02B 6/12; G02F 1/015

(52) U.S. Cl. .......................... 385/14; 359/247; 359/248

(58) Field of Search .............................. 385/14, 1–3, 5, 385/8, 10; 359/240, 241, 244, 245, 246–248, 573, 578; 257/432, 447, 460; 438/32, 65, 69

(56) References Cited

U.S. PATENT DOCUMENTS

| | | |
|---|---|---|
| 4,422,088 A | 12/1983 | Gfeller |
| 4,695,120 A | 9/1987 | Holder |
| 4,758,092 A | 7/1988 | Heinrich et al. |

(List continued on next page.)

OTHER PUBLICATIONS

Miller, DAB: "Reason and Prospects for Dense Optical Interconnections", Presentation by Stanford Univeristy Professor, (Oct. 1997).

Sakano, S. et al.: "InGaAsP/InP Monolithic Integrated Circuit with Lasers and an Optical Switch," Electronics Letters, 22(11), May 1986.

Mansuripur, M. and Goodman, JW: "Signal and Noise in Magneto–Optical Readout," J. Appl. Phys., 53(6), Jun. 1982.

"Optoelectronic VLSI Foundry Services From Lucent Technologies", Lucent Technologies Bell Labs Innovations Web Page at http:/www.bell–labs.com/project/oevlsi/, updated Mar. 2, 1997., (List continued on next page.)

*Primary Examiner*—Rodney Bovernick
*Assistant Examiner*—Michael J. Stahl
(74) *Attorney, Agent, or Firm*—Blakely, Sokoloff, Taylor & Zafman LLP

(57) ABSTRACT

An optical modulator that modulates light through the semiconductor substrate through the back side of a flip chip packaged integrated circuit. In one embodiment, an optical modulator is disposed within a flip chip packaged integrated circuit die. The optical modulator includes a deflector and a diffraction grating. A first infrared optical beam having a photon energy less than the band gap energy of the semiconductor substrate is directed through the back side of the semiconductor substrate of the integrated circuit die, deflected off the deflector through the diffraction grating and back out the back side of the integrated circuit die. A second infrared optical beam having a photon energy greater than or equal to the band gap energy of the semiconductor substrate is directed through the back side of the semiconductor substrate to generate free charge carriers and increase the modulation depth of the optical modulator. The diffraction grating modulates the phase of a portion of the deflected optical beam in response to an integrated circuit signal. A resulting diffraction interference occurs between the phase modulated portions and non-phase modulated portions of the deflected optical beam. The interference causes amplitude modulation of the zeroth order diffraction or higher order diffractions of the deflected first optical beam, from which the integrated circuit signal can be extracted.

30 Claims, 8 Drawing Sheets

U.S. PATENT DOCUMENTS

| | | | |
|---|---|---|---|
| 4,761,620 A | | 8/1988 | Bar-Joseph et al. |
| 4,865,427 A | | 9/1989 | Kingston et al. |
| 4,871,224 A | | 10/1989 | Karstensen et al. |
| 4,900,134 A | * | 2/1990 | Inoue et al. |
| 4,917,450 A | | 4/1990 | Pocholle et al. |
| 4,939,793 A | | 7/1990 | Stewrat ..................... 359/170 |
| 4,958,898 A | * | 9/1990 | Friedman et al. |
| 4,966,430 A | | 10/1990 | Weidel |
| 5,061,027 A | | 10/1991 | Richard |
| 5,153,770 A | | 10/1992 | Harris |
| 5,159,700 A | | 10/1992 | Reid et al. |
| 5,191,630 A | * | 3/1993 | Tajima ..................... 385/122 |
| 5,198,684 A | | 3/1993 | Sudo |
| 5,289,489 A | * | 2/1994 | Bergquist et al. ............. 372/26 |
| 5,311,221 A | * | 5/1994 | Vodjdani et al. ............ 359/130 |
| 5,400,419 A | | 3/1995 | Heinen |
| 5,432,630 A | | 7/1995 | Lebby et al. |
| 5,434,434 A | | 7/1995 | Kasahara et al. |
| 5,485,021 A | | 1/1996 | Abe |
| 5,502,779 A | | 3/1996 | Magel |
| 5,568,574 A | | 10/1996 | Tanguay, Jr. et al. |
| 5,605,856 A | | 2/1997 | Goosen et al. |
| 5,625,636 A | | 4/1997 | Bryan et al. |
| 5,625,729 A | * | 4/1997 | Brown ..................... 385/31 |
| 5,629,838 A | | 5/1997 | Knight |
| 5,638,469 A | | 6/1997 | Feldman et al. |
| 5,677,783 A | | 10/1997 | Bloom et al. ............... 359/224 |
| 5,696,862 A | | 12/1997 | Hauer et al. |
| 5,835,646 A | | 11/1998 | Yoshimura et al. |
| 5,864,642 A | | 1/1999 | Chun et al. |
| 5,872,360 A | | 2/1999 | Paniccia et al. |
| 6,075,908 A | * | 6/2000 | Paniccia et al. ............. 385/14 |
| 6,166,846 A | * | 12/2000 | Maloney ..................... 359/247 |
| 6,268,953 B1 | * | 7/2001 | Maloney ..................... 359/321 |

OTHER PUBLICATIONS

"Process for Fabricating OE/VLSI Chips", Lucent Technologies Bell Labs Innovations Web Page at http://www-.bell–labs.com/project/oeflsi/wfabproc.html, updated Sep. 26, 1996.

"Detailed Design Rules for Workshop Chips", Lucent Technologies Bell Labs Innovations Web Page at http://www-.bell–labs.com/roject/oevlsi/wdesrule.html, updated Mar. 7, 1997.

Cutolo, A., et al.: Silicon Electro–Optic Modulator Based on a Three Terminal Device Integrated in a Low–Loss Single–mode SOI Waveguide in J. of Lightwave Technology, vol. 15(3), Mar. 1997.

Raybon, G., et al.: "A Reconigurable Optoelectronic Wavelength Converter based on an Integrated Electroabsorption Modulated Laser Array" in 1997 Digest of the IEEE/LEOS Summer Topical Meetings, Montreal, Quebec, Canada, Aug. 1997.

Reily, DJ, and Sasian JM: "Optical Design of a Free–Space Photonic Switching System" in Applied Optics, vol. 36(19), Jul. 1997.

Heinrich, HK: "A Noninvasive Optical Probe for Detecting Electrical Signals in Silicon Integrated Circuits", Doctoral Dissertation, Stanford Univ., (Apr., 1987).

Orobtchouk, R., et al.: "Quasi–TEoo Singlemode Optical Waveguides for Electro–optical Modulation at 1.3 $\mu$m Using Standard SIMOX Material" in IEEE Proc. Optoelectron, vol. 144(2) Apr. 1997.

Soref, RA: "Electrooptical Effects of Silicon" in IEEE J of Quantum Electron. vol. QE–23(1), Jan. 1987.

Cutolo, A., et al.: "An Electrically Controlled Bragg Reflector Integrated in a Rib Silicon on Insulator Wavequide" in Appl. Phys. Sett. vol. 71(2), Jul. 1997.

Silva, MTC, and Herczfeld, PR: "Optical Intensity Modulator Based on Electrically Induced Periodic Structrue" Optoelectronics and Systems Research Laboratory, Sao Paulo & Center for Microwave and Lightwave Engineering, Drexel Univ., Philadelphia, PA. (No Date Available).

Kuwamura, Y, et al.: "Analysis of Operating Mechanism in Semiconductor Optical Modulator with Electron–Depleting Absorption Control" in Electronics and Communications in Japan, vo. 79(5), Dec. 1995.

Liu, MY and Chou, SY: "High–Modulation–Depth and Short–Cavity–Length Silicon Fabry–Perot Modulator with Two Grating Bragg Reflectors" in Appl. Phys. Letter. vol. 68(2), Jan. 1996.

Koren, U., et al.: "A Polarization Insensitive Semiconductor Optical Amplifier with Integrated Electroabsorption Modulators" in Integrated Photonics Research, Apr. 29–May 2, 1996 Technical Digest Series, vol. 6, 1996.

Krishnamoorthy, AV, and Miller, DABM: "Free–Space Optical Interconnections for VLSI Systems: A Technology Roadmap", Conference Proceedings Leos '96 9th Annual Meeting U IEEE Lasers and Electro–Optics (vol. 1,), Nov. 1996.

Goosen, KW: "GaAs MQW Modulators Integrated With Silicon CMOS" in IEEE Photonics Technology Letters, vol. 7(4), Apr. 1995.

Wang, C. et al.: "Ultrafast, All–Silicon Light Modulator," Optics Letters 19(18), Sep. 1994.

Tada, K. and Okada, Y: "Bipolar Transistor Carrier–Injected Optical Modulator/Switch: Proposal and Analysis," IEEE Electr Dev Ltrs, 7(11), 1986. (Nov.).

Fernando, C. et al: "Si/$Si_{0.85}$/$GE_{0.15}$/Si P–I–N Waveguide Optical Intensity Modulator," SPIE, vol. 2402(131), 1995 (No Month Available).

Alping, A et al.: "Highly Efficient Waveguide Phase Modulator for Integrated Optoelectronics," Appl. Phys. Lett., 48(19), May 1986.

Levitan, SP et al.: "Computer–Aided Design of Free–Space Opto–Electronic Systems," DAC 97, Anaheim, California (1997). (No Month Available).

Goodman, JW et al.: "Optical Interconnections for VLSI Systems," Proc. IEEE, 72(7), Jul. 1984.

* cited by examiner

METHOD AND APPARATUS FOR OPTICALLY MODULATING LIGHT THROUGH THE BACK SIDE OF AN INTEGRATED CIRCUIT DIE USING A PLURALITY OF OPTICAL BEAMS

RELATED APPLICATIONS

This application is a continuation-in-part application of co-pending application Ser. No. 08/993,786, filed Dec. 19, 1997, now U.S. Pat. No. 6,075,908 entitled "Method and Apparatus For Optically Modulating Light Through The Back side of an Integrated Circuit Die," and assigned to the Assignee of the present application.

BACKGROUND OF THE INVENTION

1. Field of the Invention

The present invention relates generally to integrated circuits and, more specifically, the present invention relates to the modulation of light using integrated circuits.

2. Description of the Related Art

Within the integrated circuit industry there is a continuing effort to increase integrated circuit speed as well as device density. One challenge that integrated circuit designers face with increasing circuit speeds and device densities is the increasingly significant propagation delays of circuit inputs and outputs due to the capacitive loading associated with off chip circuit connections. At slower clock speeds, the capacitive loading on integrated circuit lines is generally not a significant factor. However, as newer integrated circuit design clock speeds continue to climb towards the gigahertz range and beyond, it is evident that one of the major bottlenecks for future integrated circuits, such as for example but not limited to microprocessors, off chip caches, controllers, etc., will be the input/output bandwidth and/or round trip delay between and within chips.

Prior art attempts to address the capacitive loading problems associated with increased integrated circuit speeds and device densities have resulted in the use of larger and more powerful integrated circuit input/output drivers on the chip. Undesirable consequences of utilizing larger input/output drivers include the facts that the larger input/output drivers generally consume more power, create large di/dt noise, which requires low inductance packaging and large amount of on-die decoupling capacitance to provide a means of noise suppression, dissipate more heat and occupy more of valuable area on the integrated circuit die than smaller integrated circuit input/output drivers.

Other prior art attempts to overcome traditional integrated circuit interconnection limitations have included the use of optical interconnections. The prior art attempts at optical interconnections between integrated circuits have generally involved or have been based on two typical approaches.

One approach has been based on either using gallium arsenide (GaAs) laser diodes and modulating or switching the diodes electrically or by using GaAs built modulators that amplitude modulate a laser beam passing through the integrated circuit. The modulation is generally based on electroabsorption through strained multi-layer grown molecular beam epitaxy (MBE) films in GaAs integrated circuits. As can be appreciated to those skilled in the art, it is difficult and therefore impractical to integrate or combine III-V based technology, which includes GaAs, with standard silicon based complementary metal oxide semiconductor (CMOS) technology.

The second typical prior art approach is based on using silicon based optical waveguides. These waveguides are generally built using Silicon-on-Insulator (SOI) based processing techniques. Prior art SOI based modulators utilize silicon waveguide structures to switch light passing through the optical waveguide. The switching mechanism however utilizes injection of carriers into the waveguide rather like in a bipolar based transistor. One consequence of this is slow speed, for example up to several hundred megahertz, and very high power consumption, for example 10 mW or more for a single switch. In order to increase the modulation depth, one often tries to obtain a large interaction volume between the injected charge and the optical beam. This is generally accomplished by making very long waveguides, for example on order of thousands of microns, thereby increasing the interaction length through which the optical beam travels. As can be appreciated to those skilled in the art, actual incorporation of SOI waveguides into existing multi-layer standard CMOS based processing however is not straight forward. Hence, utilization of these waveguide structures becomes quite impractical when used for high speed input/output in large transistor count microprocessors.

SUMMARY OF THE INVENTION

An apparatus and method for modulating a first optical beam are disclosed. In one embodiment, the method comprises directing the first optical beam onto a diffractor disposed in a semiconductor substrate. The diffractor is coupled to receive a signal and the first optical beam is to have an energy less than a band gap energy of the semiconductor substrate. The method further includes diffracting the first optical beam in response to the signal and generating additional free charge carriers within the semiconductor substrate proximate to the diffractor to increase a modulation depth of the diffractor. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

Figure 1A:
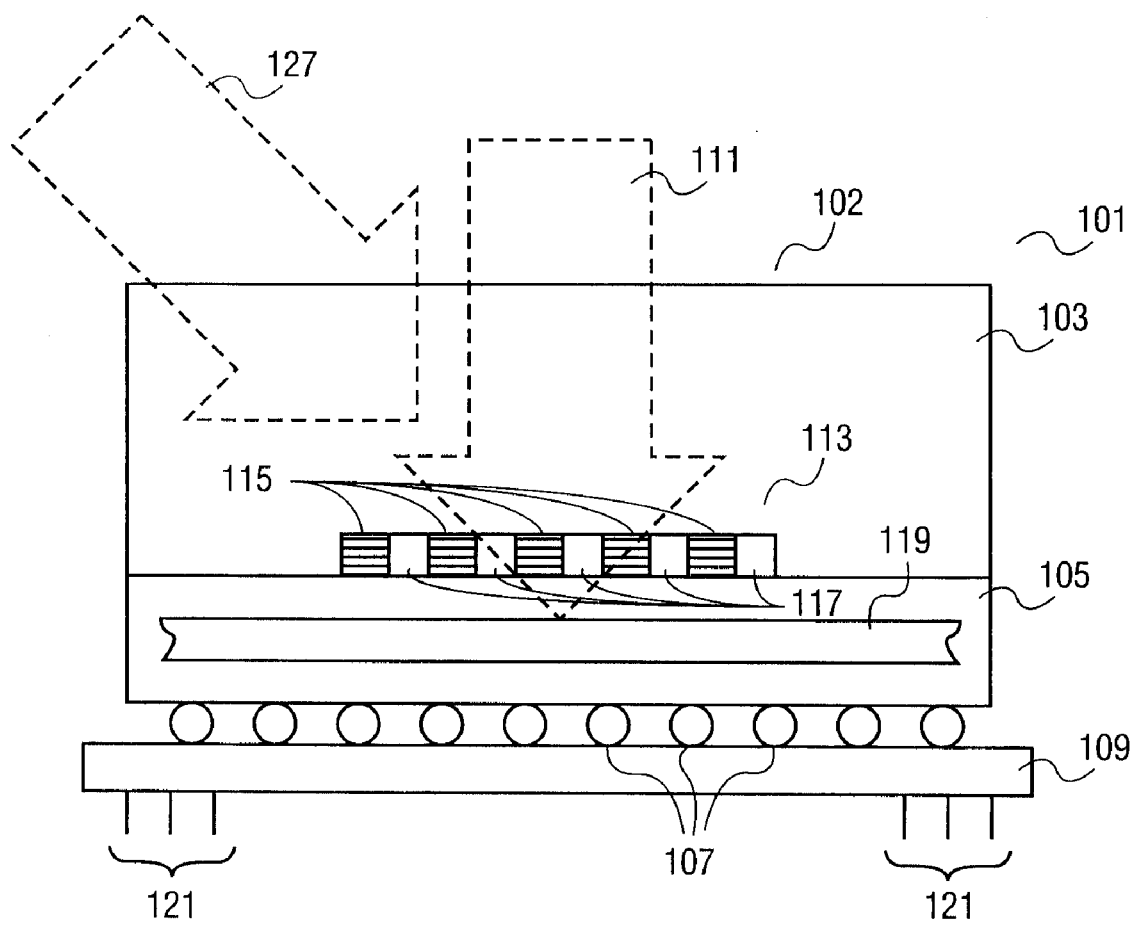
FIG. 1A is an illustration of a cross section of one embodiment of a flip chip packaged integrated circuit die with two optical beams entering the from the back side in accordance with the teachings of the present invention.

A method and an apparatus providing an optical modulator is disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

The present invention provides an optical modulator that enables integrated circuit signals to be extracted from the output circuit nodes through the back side of the semiconductor substrate of a flip chip packaged integrated circuit die. In one embodiment, an optical modulator is disposed within a flip chip packaged integrated circuit die.

In one embodiment, a first optical beam having a wavelength such that the photon energy is lower than the semiconductor band gap, is directed through the back side of a semiconductor substrate of the integrated circuit die, passes through the optical modulator and is deflected back out of the back side of the integrated circuit die. In one embodiment, the first optical beam is a multi-wavelength optical beam having multiple wavelengths around frequencies used for example in telecommunications applications (e.g. around 1.3 μm or around 1.55 μm). In one embodiment, a second optical beam having a wavelength such that the photon energy is greater than or equal to the semiconductor band gap is directed through the back side of the semiconductor substrate to generate additional free charge carriers in the semiconductor substrate of the optical modulator.

In one embodiment, the presently described optical modulator includes a diffraction grating. In one embodiment, the presently described diffraction grating includes a charged region proximate to an uncharged region. Thus, in one embodiment, the diffraction grating includes at least a single semiconductor gate structure proximate to a semiconductor source/drain region. In another embodiment, the diffraction grating includes a one dimensional array of semiconductor gate structures proximate to corresponding source/drain regions. In still another embodiment, the diffraction grating includes a two dimensional array of semiconductor gate structures proximate to corresponding source/drain regions. The diffracting property of the optical modulator is modulated in response to an integrated circuit signal. In one embodiment, the described optical modulator modulates the phase of a portion of the deflected optical beam in response to the applied signal. In one embodiment, the additional free charge carriers generated by the second optical beam increases the modulation of the presently described optical modulator. A resulting diffraction interference occurs between the phase modulated portions and non-phase modulated portions of the deflected optical beam. The interference of the two portions results in an amplitude modulation of the zeroth order and non-zeroth order diffractions of the deflected optical beam, from which the integrated circuit output signal can be extracted.

To illustrate, FIG. 1A shows one embodiment of an integrated circuit die 101 including an optical modulator in accordance with the teachings of the present invention. In one embodiment, integrated circuit die 101 is a controlled collapse circuit connection (C4) or flip chip packaged integrated circuit die coupled to package substrate 109 through ball bonds 107. As can be appreciated by those skilled in the art, ball bonds 107 provide more direct connections between the internal integrated circuit nodes of integrated circuit die 101 and the pins 121 of package substrate 109, thereby reducing inductance problems associated with typical wire bond integrated circuit packaging technologies. Another characteristic of flip chip packaging is that full access to a back side 102 of integrated circuit die 101 is provided.

In one embodiment, the optical modulator of the present invention includes a diffraction grating 113 disposed within the semiconductor substrate 103 of integrated circuit die 101. In one embodiment, diffraction grating 113 is electrically addressable and switchable, and includes an arrangement of a plurality of charged regions 115 distributed among a plurality of uncharged regions 117. In another embodiment, the diffraction grating 113 of the present invention includes at least one electrically addressable and switchable charged region 115 proximate to an uncharged region 117.

It is noted that for purposes of this disclosure, a "charged" region may be interpreted as a highly charged region having free charge carriers and an "uncharged" region may be interpreted as a region substantially without free charge carriers.

In one embodiment, a first optical beam 111 is directed through back side 102 into semiconductor substrate 103 and is deflected from a deflector 119, as shown in FIG. 1A. In one embodiment, semiconductor substrate 103 includes silicon and first optical beam 111 includes infrared or near infrared laser light having a wavelength such that the photon energy is lower than the semiconductor band gap. In one embodiment, a second optical beam 127 is directed through back side 102 into semiconductor substrate 103. In one embodiment, second optical beam 127 includes infrared or near infrared laser light having a wavelength such that the photon energy is greater than or equal to the semiconductor band gap. As known to those skilled in the art, silicon is partially transparent to infrared or near infrared light. In one embodiment, deflector 119 is a conductor, such as for example but not limited to a metal layer disposed in a dielectric isolation layer 105 of integrated circuit die 101.

Figure 1B:
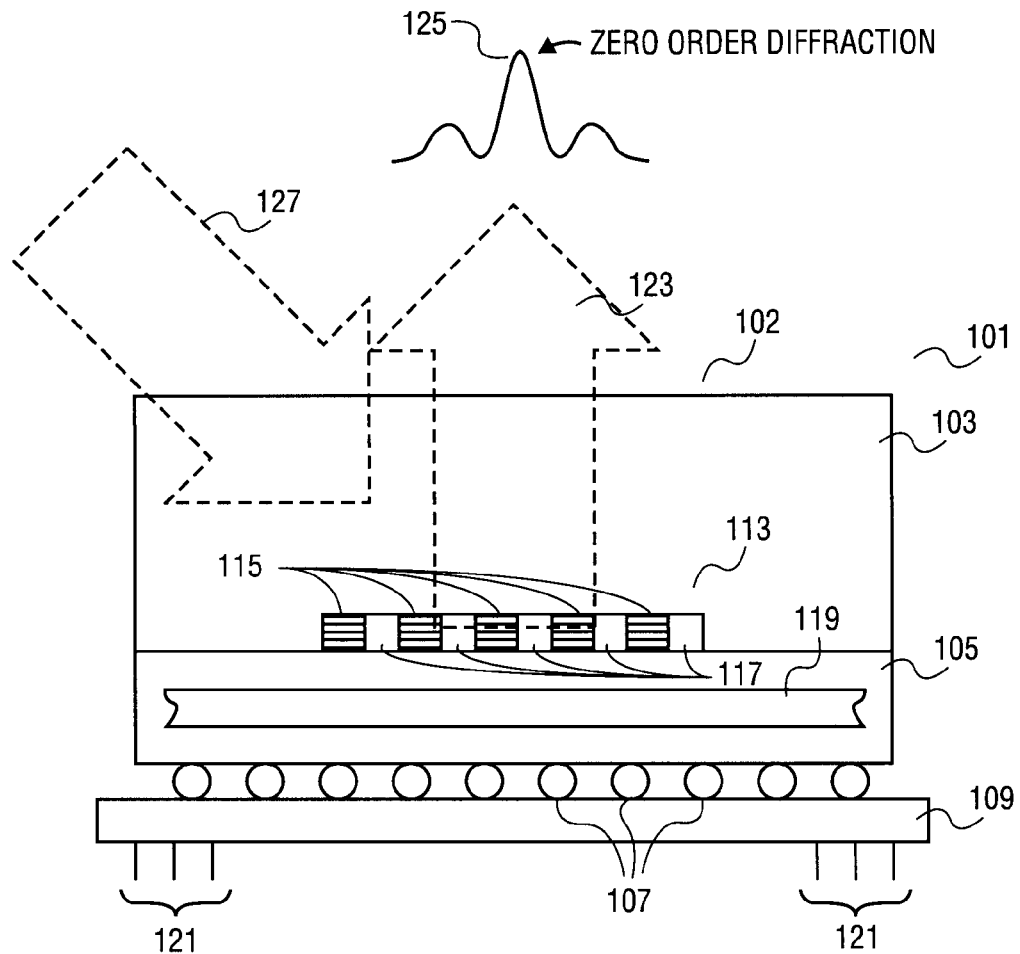
FIG. 1B is an illustration of a cross section of one embodiment of a flip chip packaged integrated circuit die with an optical beam being reflected from an optical modulator in accordance with the teachings of the present invention.

Referring now to FIG. 1B, integrated circuit die 101 of FIG. 1A is shown with first optical beam 111 being deflected from deflector 119 as a diffracted optical beam 123 through diffraction grating 113. As shown in FIG. 1B, a portion of both the incoming and the outgoing diffracted optical beam 123 passes through charged regions 115 and another portion of the incoming and outgoing diffracted optical beam 123 passes through uncharged regions 117. In one embodiment, the amount of free charge carriers in charged regions 115 is modulated in response to an integrated circuit signal in integrated circuit die 101. In one embodiment, the amount of free charge carriers in uncharged regions 117 is not modulated in response to the integrated circuit signal of integrated circuit die 101. In one embodiment, the amount of free charge carriers in charged regions 115 is increased as a result of second optical beam 127, which results in an increased modulation of the optical modulator of the present invention.

In one embodiment, diffraction grating 113 is a silicon phase grating including a single semiconductor gate structure proximate to a source/drain region, a one dimensional or a two dimensional array of complementary metal oxide semiconductor (CMOS) integrated circuit devices. As will be discussed in greater detail below, the phase of the portion of diffracted optical beam 123 passing through charged regions 115 is modulated due to the plasma optical effect. In contrast, the phase of the portion of diffracted optical beam 123 passing through uncharged regions 117 is not modulated in response to the integrated circuit signal.

The plasma optical effect arises due to an interaction between the optical electric field vector and free charge carriers that may be present along the propagation path of the optical beam 111. The electric field of the optical beam 111 polarizes the free charge carriers and this effectively perturbs the local dielectric constant of the medium. This in turn leads to a perturbation of the propagation velocity of the optical wave and hence the refractive index for the light, since the refractive index is simply the ratio of the speed of the light in vacuum to that in the medium. The free charge carriers also lead to absorption of the optical field as optical energy is used up, to accelerate the free charge carriers. Generally the refractive index perturbation is a complex number with the real part being that part which causes the velocity change and the imaginary part being related to the free charge carrier absorption. The amount of phase shift $\phi$ is given by $$\phi = (2\pi/\lambda)\Delta n L \quad \text{(Equation 1)}$$

with the optical wavelength $\lambda$ and the interaction length L. In the case of the plasma optical effect, the refractive index change $\Delta n$ due to the electron ($\Delta N_e$) and hole ($\Delta N_h$) concentration change is given by:

$$\Delta n = -\frac{e^2\lambda^2}{8\pi^2c^2\varepsilon_0 n_0}\left(\frac{b_e(\Delta N_e)^{1.05}}{m_e^*} + \frac{b_h(\Delta N_h)^{0.8}}{m_h^*}\right) \quad \text{(Equation 2)}$$

where $n_o$ is the nominal index of refraction for silicon, e is the electronic charge, c is the speed of light, $\varepsilon_o$ is the permittivity of free space, $m_e^*$ and $m_h^*$ are the electron and hole effective masses, respectively, $b_e$ and $b_h$ are fitting parameters.

As a result of the phase shifting due to the plasma optical effect, interference occuring between the phase modulated and non-phase modulated portions of diffracted optical beam 123 causes constructive and destructive interference in the beam 123 that propagates away from diffraction grating 113. Accordingly, the zeroth order diffraction 125 of diffracted optical beam 123 that passes through and propagates away from diffraction grating 113 is amplitude modulated in response to the integrated output circuit signal that modulates the amount of free charge carriers in charged regions 115. Thus, the integrated circuit signal may be extracted from the integrated circuit through the amplitude modulated zeroth order diffraction 125 of diffracted optical beam 123.

As mentioned above, in one embodiment, first optical beam 111 has a longer wavelength such that the photon energy is less than the semiconductor band gap. As can be seen from Equation 2, an optical beam with a longer wavelength sees a larger refractive index change $\Delta n$ as well as phase shift for a given free carrier concentration, since $\Delta n$ is proportional to the square of the wavelength $\lambda$. The second optical beam 127 has a shorter wavelength such that the photon energy is greater than or equal to the semiconductor band gap. As is well known to those skilled in the art, the relationship between the photon energy and wavelength of optical beam is:

$$E\lambda \approx 1.24 \text{ eV}\cdot\mu m \quad \text{(Equation 3)}$$

where E is the photon energy in eV and $\lambda$ is the wavelength of the optical beam in $\mu m$.

In one embodiment, semiconductor substrate 103 includes silicon. Silicon has a band gap energy of approximately 1.1 eV. Therefore, in one embodiment, the first optical beam 111 has a wavelength of greater than approximately 1.1 $\mu m$ and second optical beam 127 has a wavelength of less than or equal to approximately 1.1 $\mu m$, since 1.24 eV $\mu m$/1.1 eV>1.1 $\mu m$. In one embodiment, first optical beam 111 has a wavelength of 1.3 $\mu m$ or 1.55 $\mu m$ and second optical beam 127 has a wavelength of 1.064 $\mu m$ or 980 nm. In this embodiment, first optical beam 111 has a photon energy of approximately 0.95 eV (1.24 eV$\mu m$/1.3 $\mu m$) or 0.8 eV (1.24 eV$\mu m$/1.55 $\mu m$) and second optical beam 127 has a photon energy of approximately 1.17 eV(1.24 eV$\mu m$/1.064 $\mu m$) or 1.27 eV (1.24 eV$\cdot\mu m$/0.98 $\mu m$).

Figure 1C:
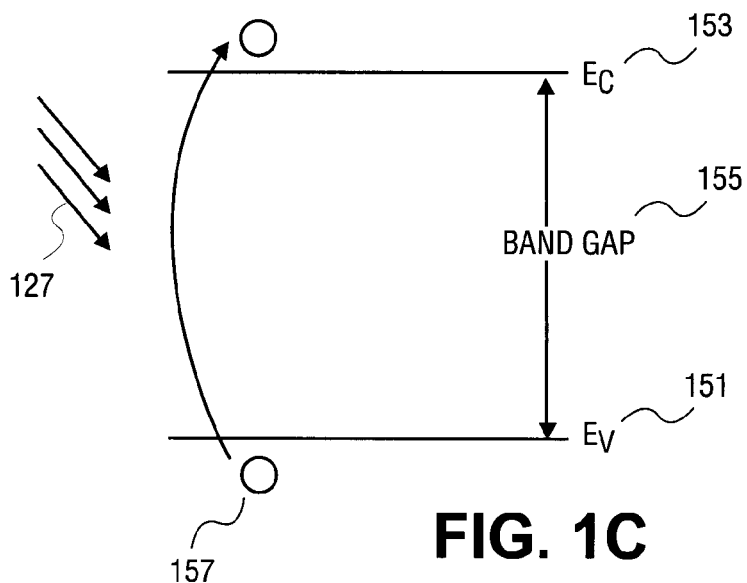
FIG. 1C is an illustration showing a charge carrier jumping from the valence band to the conduction band of a semiconductor in response to an optical beam in accordance with the teachings of one embodiment of the present invention.

FIG. 1C is an illustration of energy bands in semiconductor substrate 103. As shown, the energy bands include valence band 151 and conduction band 153. The band gap 155 represents band gap energy between valence band 151 and conduction band 153. If semiconductor substrate is silicon, band gap energy 155 is approximately 1.1 eV. When an optical beam 127, having a photon energy of greater than or equal to 1.1 eV, such as for example 1.17 eV, is directed into semiconductor substrate 103, electron 157 is given enough energy to jump from valence band 151 to conduction band 153. As is known to those skilled in the art, this creates electron-hole pairs in semiconductor substrate 103, which results in additional free charge carriers being generated in semiconductor substrate 103 as a result of optical beam 127. If optical beam 127 had a photon energy of less than the band gap 155, such as for example 0.95 eV or 0.8 eV for a silicon semiconductor substrate 103, electron 157 would not have enough energy to jump from valence band 151 to conduction band 153. Therefore, in this case, additional free charge carriers are not generated in response to optical beam 127.

Figure 2A:
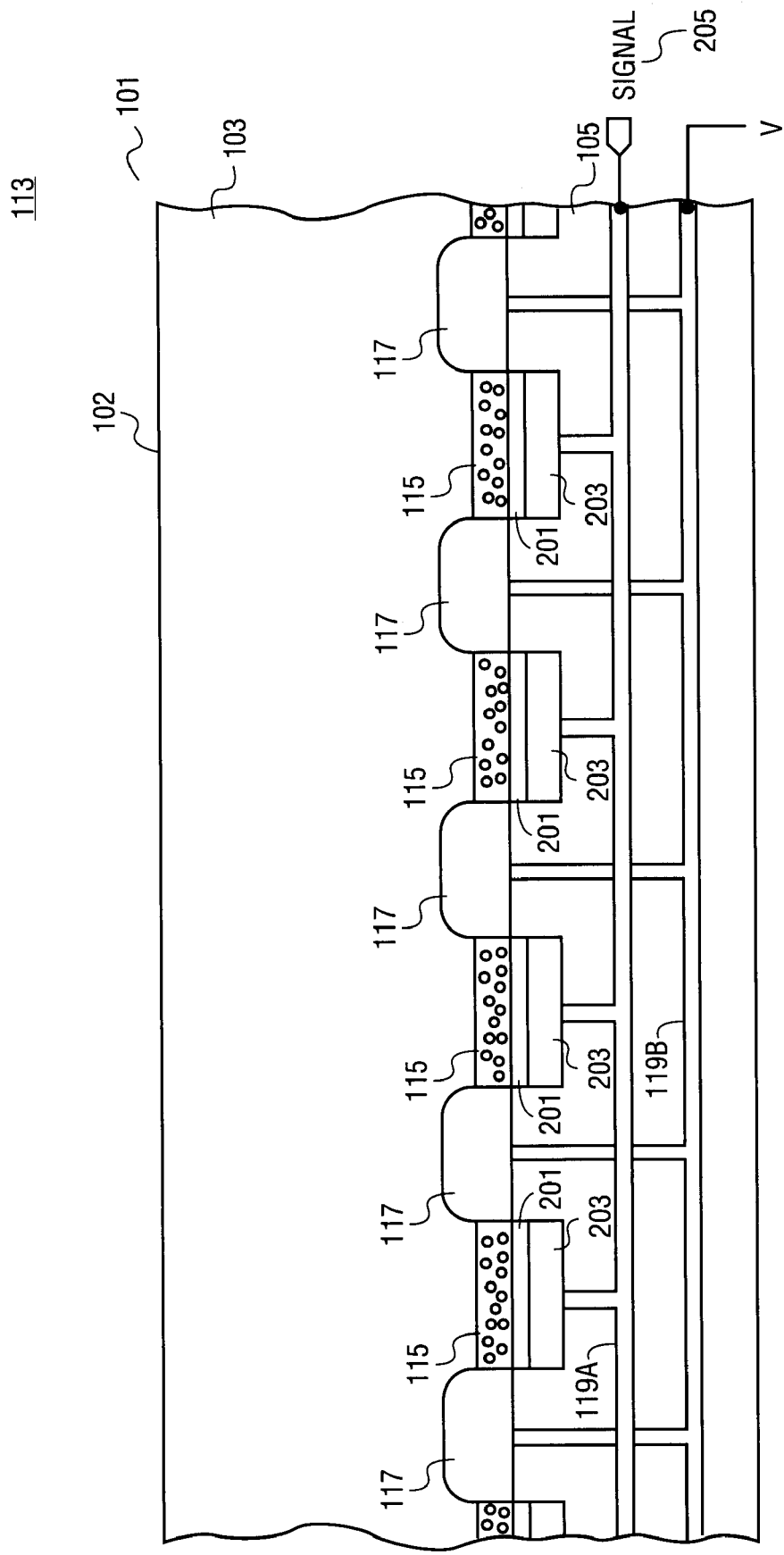
FIG. 2A is an illustration of a cross section of one embodiment of an optical modulator having a diffraction grating in accordance with the teachings of the present invention.

FIG. 2A is an illustration of a cross section of one embodiment diffraction grating 113. In one embodiment, diffraction grating 113 includes a plurality of integrated circuit devices. In another embodiment, diffraction grating 113 includes at least one integrated circuit device and one optical reflector, for example a poly gate or a metal layer. In one embodiment the integrated circuit devices include transistors coupled as metal oxide semiconductor field effect transistor (MOSFET) capacitors with source and drain shorted together. In particular, FIG. 2A shows a plurality of source/drain doped regions 117 disposed in a silicon substrate 103 of a flip chip packaged integrated circuit die 101. In one embodiment, polysilicon gates 203 are disposed in a dielectric isolation layer 105 between each one of the plurality of doped regions 117. As also shown in FIG. 2A, a gate insulator 201 is disposed between each polysilicon gate 203 and silicon substrate 103. In the embodiment shown, each doped region 117 is commonly coupled through conductor 119B to a common potential V, such as for example ground for n channel MOSFETs or $V_{cc}$, for p channel MOSFETs. In another embodiment, potential V is $V_{cc}$ for n channel MOSFETs and ground for p channel MOSFETs. In still another embodiment, source and drain are coupled to different potentials. Each one of the polysilicon gates 203 is coupled to a signal 205 through conductor 119A.

In operation, with the commonly coupled doped regions 117 coupled to the common potential V and polysilicon gates 203 coupled to signal 205, the integrated circuit devices are biased in one embodiment to form highly charged inversion layers in the channels 115, which are disposed between each one of the doped regions 117 in silicon substrate 103. The amount of free charge carriers in inversion layers 115 is modulated in response to input signal 205. To illustrate, in one embodiment doped regions 117 include N+ doped regions disposed in a P-type semiconductor substrate 103. In another embodiment, doped regions 117 include P+ doped regions disposed in an N-type semiconductor substrate 103.

In one embodiment, each one of doped regions 117 is an $N^+$ doped region that are commonly coupled to common potential V through conductor 119B. Each one of the integrated circuit devices shown forms negative charges in channels 115 that form capacitors coupled to signal 205. The amount of free charge carriers in the charged inversion layers, or channels 115, is modulated in response to signal 205. In one embodiment, capacitor structures are utilized instead of MOS transistor structures as the non-mobile inversion layer in the MOSFET capacitor channel is used to modulate the infrared optical beam.

Figure 2B:
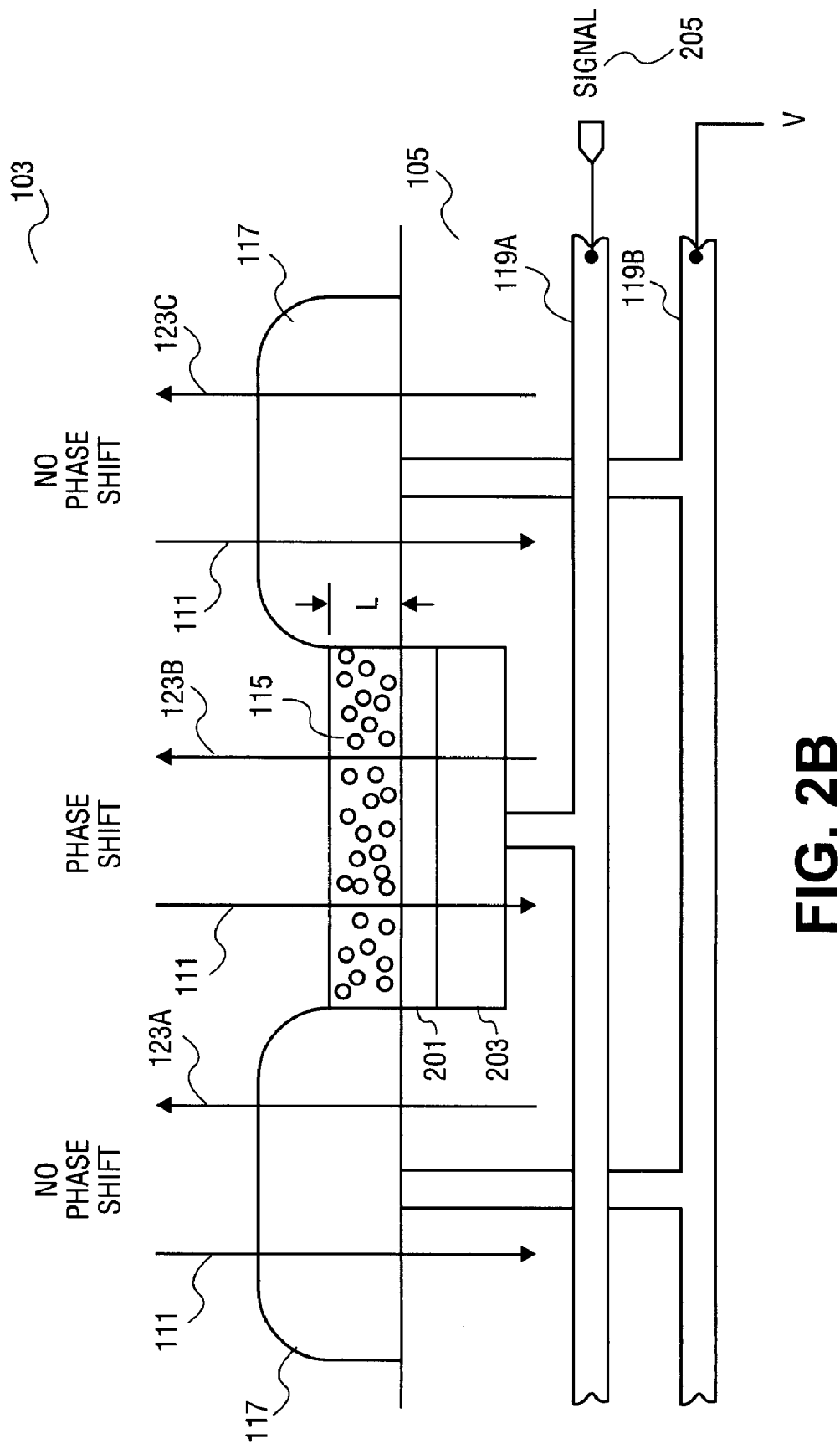
FIG. 2B is an illustration showing greater detail of one embodiment of a cross section of the optical modulator on which one optical beam is directed in accordance with the teachings of the present invention.

FIG. 2B is a cross section of one embodiment of an integrated circuit device of diffraction grating 113 shown in greater detail. In particular, FIG. 2B shows source/drain doped regions 117 disposed in a silicon substrate 103. Channel 115 is formed in the silicon substrate 103 between the doped regions 117. As shown in FIG. 2B, gate insulator layer 201 and a polysilicon gate 203 are disposed in dielectric isolation layer 105 proximate to channel 115. In one embodiment, doped regions 117 are $N^+$ doped regions that are commonly coupled to potential V through conductor 119B. A highly charged inversion layer is formed in channel 115. Polysilicon gate 203 is coupled to signal 205 through conductor 119A. The amount of free charge carriers in channel 115 is modulated in response to signal 205.

FIG. 2B illustrates optical beam 111 passing through each of the doped regions 117 as well as channel 115. Optical beam 111 is deflected off a deflector, which in one embodiment may be a conductor 119A or 119B or poly gate 203, and back out of the semiconductor substrate 103. As shown in FIG. 2B, deflected optical beams 123A and 123C pass through doped regions 117. Deflected optical beam 123B passes through the modulating inversion layer of channel 115.

As discussed above, deflected optical beam 123B is phase shifted due to the free charge carriers in channel 115 due to the plasma optical effect. Since the amount of free charge carriers in channel 115 is modulated in response to signal 205, the phase of deflected optical beam 123B is also modulated in response to signal 205. In contrast, there is no relative phase shift modulation in deflected optical beams 123A and 123C since there is substantially no applied modulated voltage in doped regions 117.

Referring briefly back to FIG. 2A, in one embodiment, the alternating arrangements of doped regions 117 and channels 115 form a one or two dimensional phase array, or phase diffraction grating, which causes constructive and destructive interference in the wavefronts that propagate away from diffraction grating 113. In another embodiment, a phase diffraction grating is provided with at least one doped region 117 proximate to at least one channel 115 to cause constructive and destructive interference in wavefronts that propagate away from diffraction grating 113. Since the amount of phase shift in the deflected optical beams that pass through channels 115 is modulated in response to signal 205, the optical power in the zeroth order diffraction beam, and higher order diffraction beams, is modulated accordingly. As the grating is turned on and off, the total optical power in the deflected beam that comes back out of the silicon is unaltered, but when the grating is activated with a signal, optical power is redistributed due to interference from the zeroth order to higher orders. The key to detecting the power modulation is either to only look at the zeroth order diffraction or only look at all or some of the higher orders but not the zeroth order. If one looks at the zeroth order diffraction, the photodetector sees a nominal direct current (DC) power with the grating off and a changed power when the modulator is turned on. Thus, the photodetector sees both an alternating current (AC) power signal, which in one embodiment is the signal of interest, as well as a DC power component. In one embodiment, the modulation depth may be defined by the relationship:

$$\text{modulation depth} = AC/DC \tag{Equation 4}$$

where AC and DC represent the AC and DC signal components, respectively, observed by a photodetector monitoring the diffracted optical beam deflected by the optical modulator. In one embodiment, it is desirable to increase the modulation depth ratio of Equation 4 to increase the signal to noise ratio of the presently described optical modulator.

When looking at the higher orders of diffraction, the photodetector can sees zero power with the grating off and a finite power with the grating on, which gives a 100% modulation. Using known techniques in optical signal recovery, signal 205 can be extracted from the modulated zeroth order diffraction or the higher order diffractions of the deflected optical beams.

It is observed in Equation 1 above that the amount of phase shift is dependent upon the thickness L of the interaction region as well as the refractive index change induced by the electrical signal, which is determined by the amount of free carriers the applied voltage can sweep into and out of the interaction region. Typical inversion/accumulation layers found in many of today's advanced CMOS technology are quite thin, for example on the order of approximately 5 nm. From FIG. 2B one can observe that the path length L through which the optical beam passes is thus very small. This may result, depending on the free charge carrier density, in a very small phase shift. Correspondingly, this will result in a very small amplitude modulation in the AC signal component relative to the DC signal component. This corresponds to a relatively low modulation depth. With limitation to how much one can change the free charge carrier density in the inversion layer, it is evident that it would be beneficial to increase the interaction length L or increase the number of free charge carriers for which the optical beam passes so that the total amount of free charges that the applied signal 205 can sweep into and out of the interaction region is increased. That is, by increasing the amount of the removable free charge carriers, one can increase the plasma optical induced phase shift and as a result, increase the amplitude modulation. One embodiment for accomplishing this is discussed in more detail below.

Figure 2C:
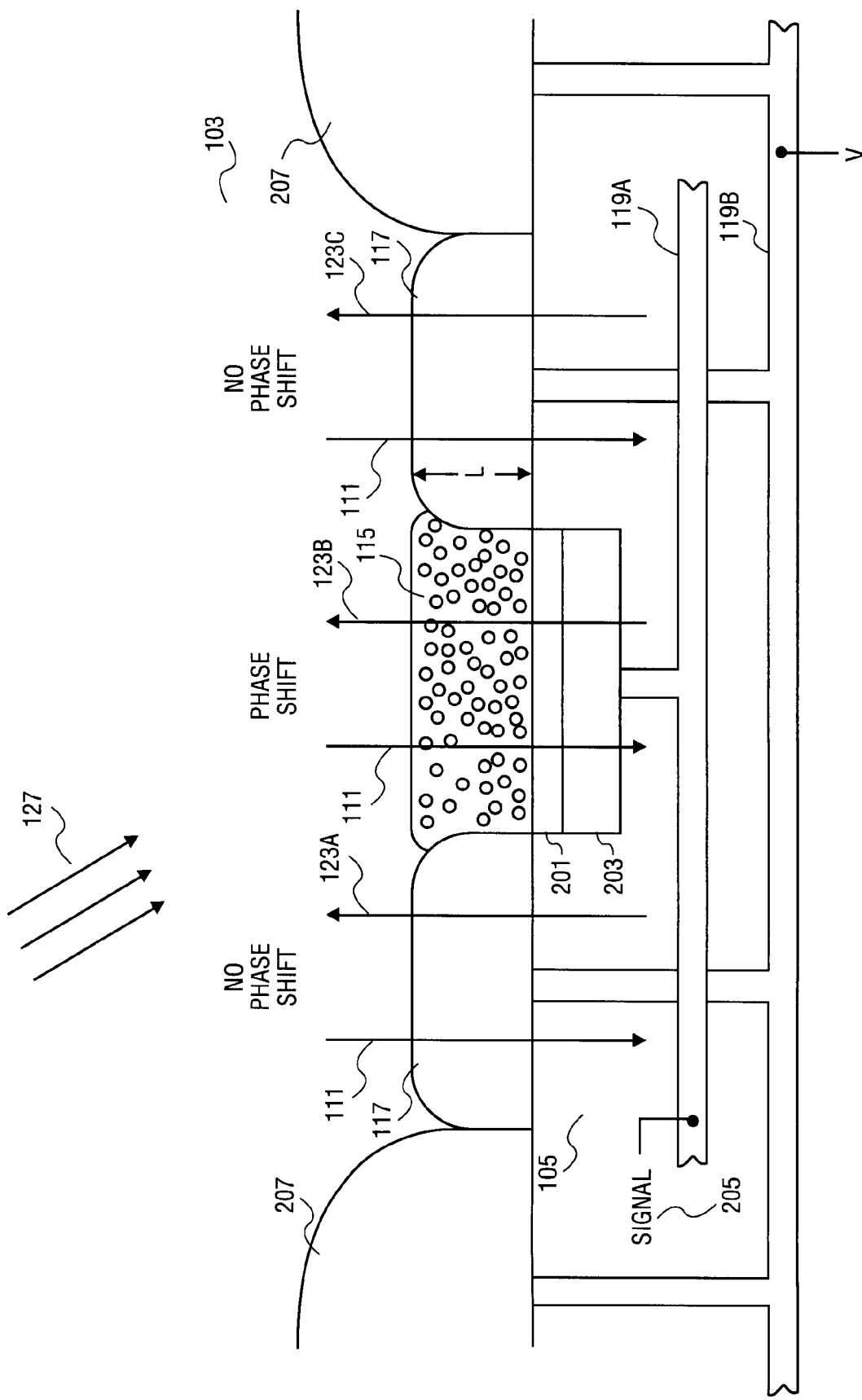
FIG. 2C is an illustration showing greater detail of one embodiment of a cross section of the optical modulator on which two optical beams are directed in accordance with the teachings of the present invention.

It is appreciated that L as shown in FIG. 2B is illustrated without second optical beam 127 being directed into the semiconductor substrate 103. As a result, the amount of the removable free charge carriers in FIG. 2B is relatively small. In comparison, FIG. 2C is an illustration of a cross section of one embodiment of a presently described diffraction grating 113 disposed in a semiconductor substrate 103, through which second optical beam 127 is directed. As mentioned above, second optical beam 127 in one embodiment has a wavelength such that the photon energy is greater than or equal to the band gap energy of semiconductor substrate 102. In an embodiment in which semiconductor substrate includes silicon, which has a band gap energy of approximately 1.1 eV, second optical beam has a photon energy of greater than or equal to 1.1 eV. According to Equation 3 above, this corresponds to a wavelength of less than or equal to approximately 1.1 µm.

As a result of second optical beam 127, electron-hole pairs are generated in semiconductor substrate 103, leading to an increase in both majority and minority carrier concentration. Therefore, more free charge carriers may be swept into and out of the charged region of channel 115. In one embodiment, these additional free charge carriers increase the amount of phase shift due to free charge carriers according to Equation 1 and 2. As a result, the amplitude modulation of the AC signal seen by a photodetector observing diffracted optical beam 123 deflected from the presently described optical modulator is also increased. This results in a desired increased modulation depth according to Equation 4. In addition, the second laser beam also increases the local temperature which in turn also accelerates the free carrier generation.

In one embodiment, the source/drain doped regions 117 are coupled to a common potential V through conductor 119B to attract some of the additional free charge carriers through the drift process in the case when signal 205 is a zero input. This will improve the response time of the device in comparison with the situation when the source/drain are grounded with diffusion being the charge transport mechanism. For instance, for N+ doped source/drain regions 117 in a P-type semiconductor substrate 103, source/drain regions 117, potential V in one embodiment is $V_{cc}$ to attract electrons. As a result, the free charge carriers generated by second optical beam 127 are swept out of the uncharged regions of the presently described optical modulator independent of signal 205. In another embodiment, for P+ doped source/drain regions 117 in a N- type semiconductor substrate 103, source/drain regions 117, potential V in one embodiment is ground to attract holes for the same reason for response time improvement.

In another embodiment, the presently described optical modulator further includes well regions or doped regions 207 to attract some of the additional free charge carriers generated by second optical beam 127 for the same reason for response time improvement. As shown in FIG. 2C, well regions in one embodiment are coupled to common potential V through conductor 119B. In one embodiment, well regions 207 are N+ doped regions in a P- type semiconductor substrate 103. In this embodiment, potential V is $V_{cc}$ to attract electrons. In another embodiment, well regions 207 are P+ doped regions in an N- type semiconductor substrate 103. In this embodiment, potential V is ground to attract holes. As a result, the free charge carriers generated by second optical beam 127 are swept out of the uncharged regions of the presently described optical modulator through drift when the voltage of the signal 205 is zero. The free charge carriers are dragged into the region when the voltage of the signal 205 is not zero.

Figure 3A:
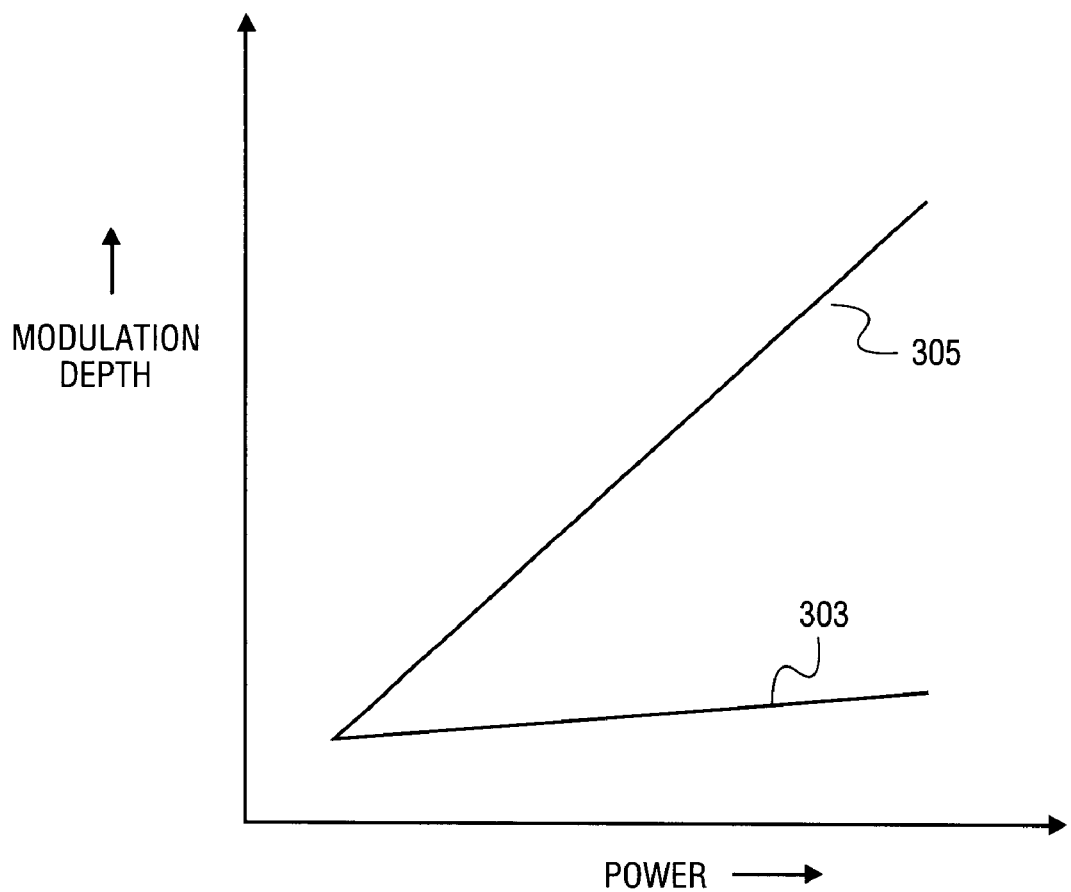
FIG. 3A is a diagram illustrating the relationship between modulation depth and power for two optical beams having two different wavelengths in accordance with the teachings of one embodiment of the present invention.

FIG. 3A is a diagram 301 illustrating one embodiment of the relationship and between the modulation depth of the presently described optical modulator using only the first optical beam 111 and the optical power or intensity of the beam. In the embodiment illustrated, the semiconductor substrate 103 includes silicon. Trace 303 shows the relationship for the optical beam 111 having a wavelength greater than 1.1 µm, which translates to a photon energy less than the band gap energy of silicon. Trace 305 shows the relationship for the optical beam 111 having a wavelength less than or equal to 1.1 µm, which translates to a photon energy greater than or equal to the band gap energy of silicon.

As shown in FIG. 3A, the modulation depth increases a greater amount per unit of increased power in trace 305 when compared to trace 303. One explanation for this might be that more free charge carriers are generated in the semiconductor substrate at higher power levels with trace 305 when compared to trace 303, allowing more charge carriers being swept into and out of the interaction region. However, it is noted that in one embodiment, the deflected power in the case of trace 305 can be small, where the beam has a photon energy larger than the band gap. This is because the light is strongly absorbed by the substrate 103 and there is little light, which can double-pass though the substrate. In addition, these wavelengths are not compatible to the ones used in the telecommunications applications.

Using an optical beam having a photon energy that is less than the semiconductor band gap, the beam sees a larger refractive index change for a given free-carrier concentration, as can be seen from Equation 2. However, as shown in trace 303, increased amounts of power in a first optical beam having a photon energy less than the band gap energy of the semiconductor substrate do not result in as high a modulation depth, because no additional free carriers are generated by the light.

Figure 3B:
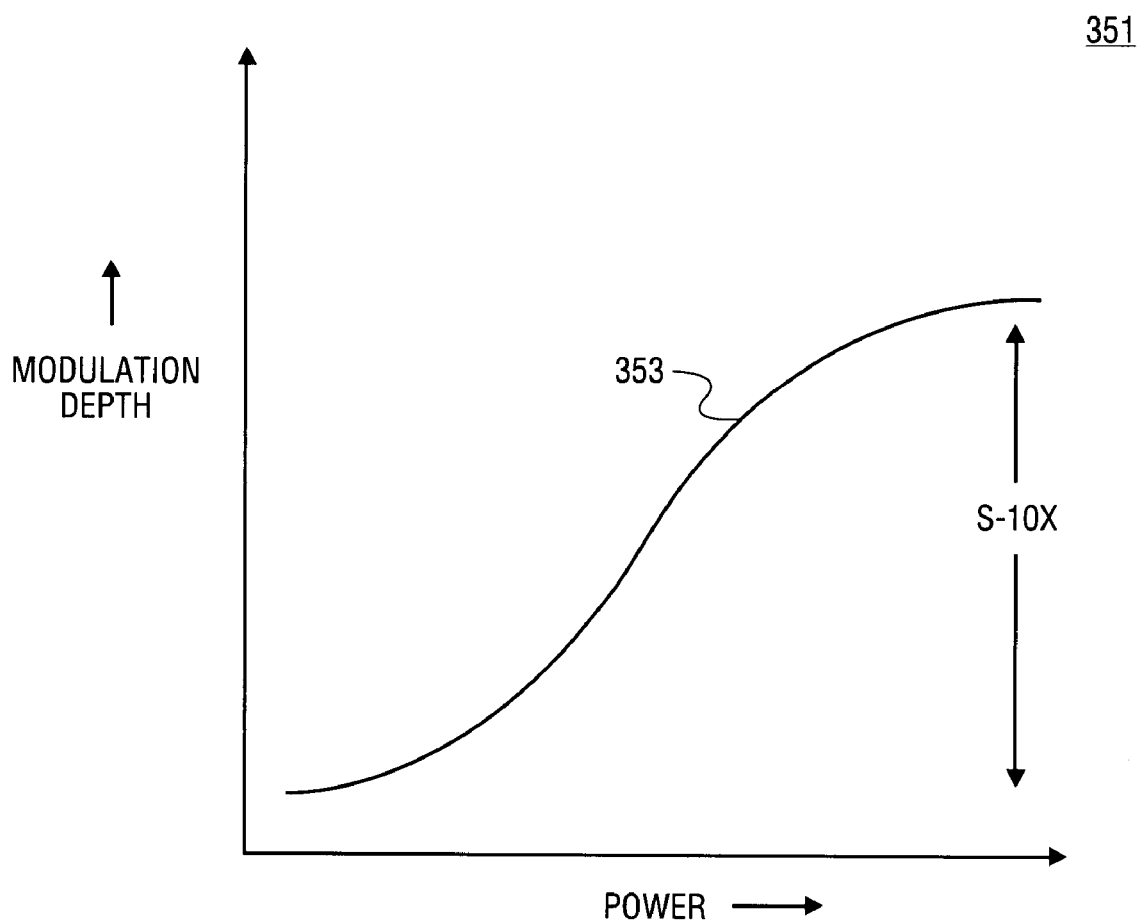
FIG. 3B is a diagram illustrating the relationship between modulation depth of a first optical beam having an energy less than the semiconductor band gap and power of a second optical beam having an energy greater than or equal to the semiconductor band gap in accordance with the teachings of one embodiment of the present invention.

FIG. 3B is a diagram 351 that shows a solution provided by the present invention by using both the first and second optical beams. Trace 353 shows the relationship of the modulation depth of one embodiment of the presently described optical modulator using a first optical beam having a photon energy less than the band gap energy of the semiconductor substrate in relationship to the power of a second optical beam having a photon energy greater than or equal to the band gap energy of the semiconductor substrate. That is, the x-axis of FIG. 3B corresponds to the power of the second optical beam. As shown in FIG. 3B, in one embodiment the modulation depth increases and plateaus at a modulation depth five to ten times greater with increased power in the second optical beam. In one embodiment, the specific power selected for the second optical beam is such that the increased modulation depth at the higher plateau according to FIG. 3B is realized. In one embodiment, the higher modulation depth is realized with the first and second optical beams without unduly slowing the integrated circuit device or generating a severe non-flat frequency response.

Figure 4:
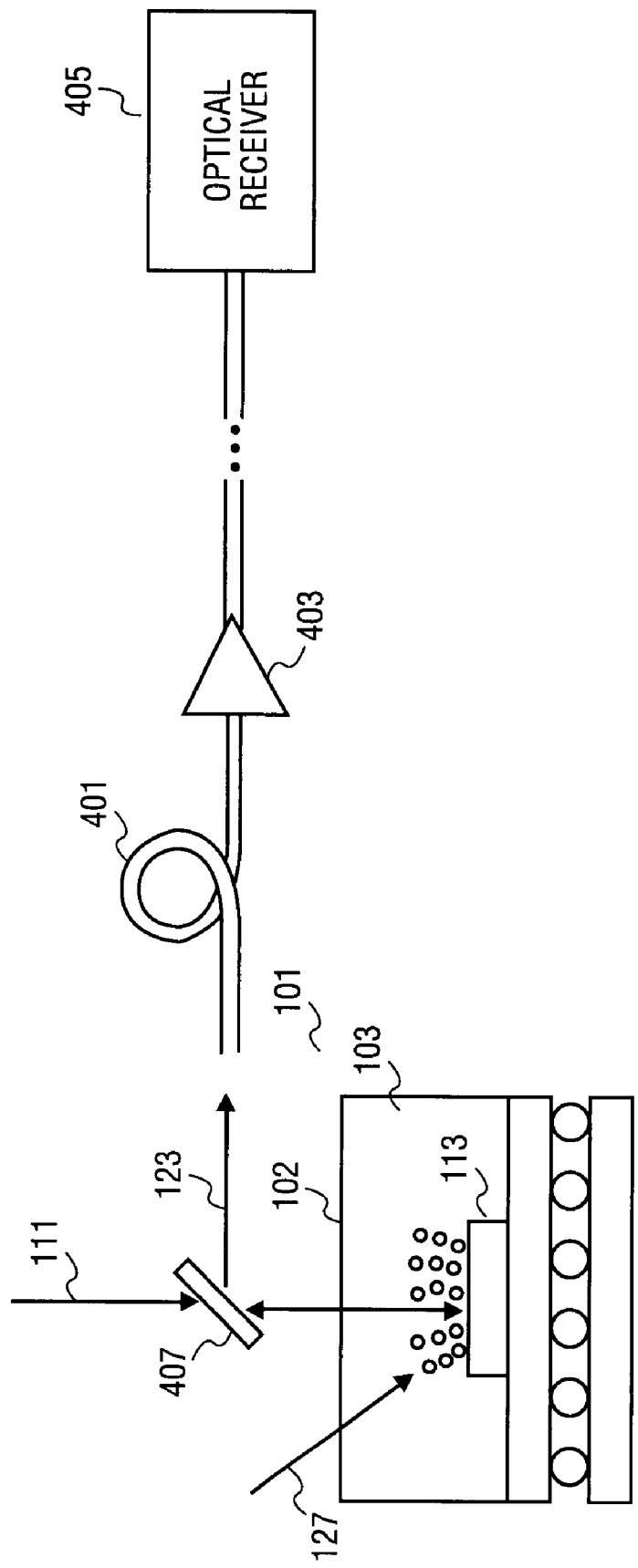
FIG. 4 is a diagram illustrating one embodiment of an optical modulator in accordance with the teachings of the present invention optically coupled to an optical fiber and an optical receiver.

FIG. 4 is a diagram illustrating one embodiment of an optical modulator in accordance with teachings of the present invention used for telecommunications purposes. In the embodiment illustrated, FIG. 4 shows a flip chip package integrated circuit die 101 including a diffraction grating 113 disposed in semiconductor substrate 103. In one embodiment, diffraction grating 113 includes at least one charged region proximate to at least one uncharged region. A second optical beam 127 having a photon energy greater than or equal to the band gap energy of semiconductor substrate 103 is directed through the back side 102 of semiconductor substrate 103 to generate additional free charge carriers proximate to diffraction grating 113. A first optical beam 111 is directed through back side 102 to diffraction grating 113. First optical beam 111 has a photon energy less than the band gap energy of semiconductor substrate 103, which can be chosen to be the wavelengths used in the telecommunication applications. First optical beam is diffracted in response to a signal.

In one embodiment, the resulting diffracted optical beam 123 is deflected out through back side 102 and is directed via optics 407 into an optical fiber 401 to optical receiver 405. In one embodiment, optical fiber 401 includes an optical amplifier 403.

In one embodiment, semiconductor substrate 103 includes silicon, which has a band gap energy of approximately 1.1 eV. In one embodiment, second optical beam 127 has a wavelength of 1.064 $\mu$m, which translates to a photon energy of approximately 1.17 eV. In one embodiment, first optical beam 111 is a single-wavelength beam having a wavelength of for example 1.3 $\mu$m, which translates to a photon energy of approximately 0.95 eV. In another embodiment, first optical beam has single-wavelength or multi-wavelength beam having wavelengths around 1.55 $\mu$m, which can be split to multiple sub-beams by the optics 407 for multiple phase gratings. As is known to those skilled in the art, single or multi-wavelength optical beams having wavelengths of 1.3 $\mu$m or around 1.55 $\mu$m are often used in telecommunications applications and are desirable due to reduced attenuation in optical fibers such as optical fiber 401. In one embodiment, optical amplifier includes an erbium doped fiber amplifier (EDFA). As is known to those skilled in the art, EDFAs provide optical amplification by stimulated emission of optical beams having wavelengths around 1.55 $\mu$m. In addition, as is known to those skilled in the art, EDFAs are also desirable due to their known broad and flat gain spectrum, which makes them suitable for wavelength division multiplexing (WDM) and dense wavelength division multiplexing (DWDM) applications. Thus, in one embodiment, multi-wavelength optical beams are will suited for WDM and DWDM applications in accordance with the teachings of the present invention.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method of modulating a first optical beam comprising:
    directing the first optical beam onto a diffraction grating including a metal oxide semiconductor (MOS) transistor structure disposed in a semiconductor substrate, the diffraction grating coupled to receive a signal, the first optical beam to have an energy less than a band gap energy of the semiconductor substrate;
    coupling a drain region and a source region of the MOS transistor structure so as to form a capacitor;
    diffracting the first optical beam in response to the signal; and
    generating additional free charge carriers within the semiconductor substrate proximate to the diffraction grating to increase a modulation depth of the diffraction grating.

2. The method of claim 1 wherein generating additional free charge carriers includes directing a second optical beam onto the diffraction grating, the second optical beam to have an energy greater than or equal to the band gap energy of the semiconductor substrate.

3. The method of claim 1 wherein directing the first optical beam onto the diffraction grating disposed in the semiconductor substrate includes directing the first optical beam through a back side of an integrated circuit die.

4. The method of claim 2 wherein directing the second optical beam onto the diffraction grating includes directing the second optical beam through a back side of an integrated circuit die.

5. The method of claim 1 wherein diffracting the first optical beam in response to the signal includes sweeping free charge carriers into and out of a charged region in the semiconductor substrate in response to the signal.

6. The method of claim 5 including sweeping free charge carriers out of an uncharged region proximate to the charged region in the semiconductor substrate independent of the signal.

7. The method of claim 6 wherein sweeping free charge carriers out of the uncharged region proximate to the charged region includes coupling a doped region in the uncharged region to a first potential to attract the free charge carriers from the uncharged region.

8. The method of claim 1 wherein diffracting the first optical beam in response to the signal includes:
    changing a phase of a portion of the first optical beam passing through a charged region in the semiconductor substrate in response to the signal; and
    leaving a phase of a portion of the first optical beam unchanged passing through an uncharged region proximate to the charged region in the semiconductor substrate.

9. The method of claim 3 including deflecting the first optical beam out of the back side of the integrated circuit die, the deflected first optical beam diffracted in response to the signal.

10. The method of claim 9 including directing the diffracted first optical beam into an optical fiber optically coupled to the diffraction grating.

11. The method of claim 10 including amplifying the diffracted first optical beam with an amplifier included in the optical fiber.

12. An optical modulator, comprising:
    a diffraction grating including a metal oxide semiconductor (MOS) transistor structure disposed in a semiconductor substrate, the MOS transistor structure having a drain region and a source region commonly coupled so as to form a capacitor, the diffraction grating to diffract a first optical beam directed to the diffraction grating through the semiconductor substrate in response to a signal; and
    a deflector disposed proximate to the diffraction grating, the deflector to deflect the first optical beam such that a diffracted first optical beam is deflected out of the semiconductor substrate, wherein a second optical beam is directed to the diffraction grating through the semiconductor substrate to generate additional free charge carriers in the semiconductor substrate proximate to the diffraction grating.

13. The optical modulator of claim 12 wherein the first optical beam has an energy less than a band gap energy of the semiconductor substrate and the second optical beam has an energy greater than or equal to the band gap energy of the semiconductor substrate.

14. The optical modulator of claim 12 wherein the semiconductor substrate comprises silicon.

15. The optical modulator of claim 14 wherein the first optical beam has a wavelength of greater than approximately 1.1 micrometers and the second optical beam has a wavelength of less than or equal to approximately 1.1 micrometers.

16. The optical modulator of claim 12 wherein the first and second optical beams are directed to the diffraction grating through a back side of the semiconductor substrate, wherein the first optical beam is deflected out of the semiconductor substrate through the back side of the semiconductor substrate.

17. The optical modulator of claim 12 wherein the diffraction grating comprises a charged region in the semiconductor substrate and an uncharged region in the semiconductor substrate proximate to the charged region, wherein free charge carriers are swept into and out of the charged region in response to the signal.

18. The optical modulator of claim 17 wherein the uncharged region comprises a doped region of the semiconductor substrate.

19. The optical modulator of claim 18 wherein the doped region is coupled to a potential to sweep free charge carriers from the uncharged region independent of the signal.

20. The optical modulator of claim 17 further comprising a gate electrode coupled to receive the signal and disposed proximate to the charged region.

21. The optical modulator of claim 12 further comprising an optical fiber optically coupled to the semiconductor substrate such that the diffracted first optical beam is deflected out of the semiconductor substrate and is directed into the optical fiber.

22. The optical modulator of claim 21 wherein the optical fiber comprises an optical amplifier.

23. The optical modulator of claim 22 wherein the optical amplifier comprises an erbium doped fiber amplifier.

24. The optical modular of claim 23 wherein the first optical beam is a multiple-wavelength optical beam having wavelengths around 1.55 micrometers.

25. An optical modulator, comprising:
a diffractor disposed in a semiconductor substrate, the diffractor coupled to receive a signal;
a first optical source to generate a first optical beam directed to the diffractor through the semiconductor substrate through a back side of the semiconductor, the diffractor to diffract the first optical beam in response to the signal;
a deflector disposed proximate to the diffractor, the deflector to deflect the first optical beam such that a diffracted first optical beam is deflected out of the semiconductor substrate; and
a second optical source to generate a second optical beam directed to the diffractor through the semiconductor substrate through the back side of the semiconductor, the second optical beam to generate additional free carriers in the semiconductor substrate proximate to the diffractor.

26. The optical modulator of claim 25 wherein the diffractor comprises a charged region in the semiconductor substrate and an uncharged region in the semiconductor substrate proximate to the charged region, wherein free charge carriers are swept into and out of the charged region in response to the signal and the uncharged region is substantially free of free charge carriers.

27. The optical modulator of claim 26 wherein the uncharged region includes a doped region coupled to a potential to sweep free charge carriers from the uncharged region independent of the signal.

28. The optical modulator of claim 25 wherein the first optical beam has an energy less than a band gap energy of the semiconductor substrate and the second optical beam has an energy greater than or equal to the band gap energy of the semiconductor substrate.

29. The optical modulator of claim 25 further comprising an optical fiber optically coupled to the back side of the semiconductor substrate, the diffracted first optical beam is directed into the optical fiber.

30. The optical modulator of claim 29 wherein the optical fiber includes an optical amplifier.

* * * * *